United States Patent
Koike et al.

(10) Patent No.: US 8,592,120 B2
(45) Date of Patent: Nov. 26, 2013

(54) RESIN FOR TONER AND TONER COMPOSITION

(75) Inventors: Masanori Koike, Kyoto (JP); Hideaki Saito, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 32 days.

(21) Appl. No.: 12/601,817

(22) PCT Filed: May 28, 2008

(86) PCT No.: PCT/JP2008/059788
§ 371 (c)(1),
(2), (4) Date: Mar. 11, 2010

(87) PCT Pub. No.: WO2008/149740
PCT Pub. Date: Dec. 11, 2008

(65) Prior Publication Data
US 2010/0196812 A1    Aug. 5, 2010

(30) Foreign Application Priority Data
May 31, 2007    (JP) ................................. 2007-146284

(51) Int. Cl.
*G03G 9/087*    (2006.01)

(52) U.S. Cl.
USPC ....................................... 430/109.4; 528/271

(58) Field of Classification Search
USPC ....................................... 430/109.4; 528/271
See application file for complete search history.

(56) References Cited

U.S. PATENT DOCUMENTS

| | | | |
|---|---|---|---|
| 6,335,139 B1 * | 1/2002 | Gambayashi et al. ..... | 430/111.4 |
| 2004/0241565 A1 * | 12/2004 | Kishiki et al. ............. | 430/109.4 |
| 2006/0251981 A1 * | 11/2006 | Koyama et al. ............ | 430/109.4 |
| 2009/0305157 A1 * | 12/2009 | Koike et al. ................ | 430/109.4 |

FOREIGN PATENT DOCUMENTS

| | | | |
|---|---|---|---|
| JP | 03-188468 | 8/1991 | |
| JP | 2002-148867 | 5/2002 | |
| JP | 2002-341598 | 11/2002 | |
| JP | 2005-157074 | * 6/2005 | ............. G03G 9/087 |
| JP | 2005-157074 A | 6/2005 | |
| JP | 2007-011307 | 1/2007 | |
| KR | 10-2005-0051543 | 6/2005 | |
| WO | WO-2006/126667 | 11/2006 | |
| WO | WO 2006/126667 | * 11/2006 | |

OTHER PUBLICATIONS

Translation of JP 2005-157074 published Jun. 2005.*
Notice of Reasons for Refusal mailed Mar. 2, 2010 in corresponding Japanese Patent Application No. 2008-139653 (with partial English translation).
Korean Office Action mailed Mar. 30, 2012, in corresponding Korean Patent Application No. 10-2009-7024844.
Korean Office Action mailed Jul. 28, 2011 in corresponding Korean Patent Application No. 10-2009-7024844.

* cited by examiner

*Primary Examiner* — Peter Vajda
(74) *Attorney, Agent, or Firm* — Edwards Wildman Palmer LLP

(57) ABSTRACT

The object is to develop a resin for a toner, which has both of hot offset resistance and a low-temperature fixing property even when used in a high-speed and energy-saving toner. Thus, disclosed is a resin for a toner, which comprises a polyester resin (A) having a THF insoluble fraction content of 1 to 36 wt %, a peak top molecular weight of 4500 to 20000 as measured by gel permeation chromatography on a THF soluble fraction, and a softening point of 120 to 180° C., and meeting the requirements represented by the following formulae (1) and (2):

(Acid value)/(hydroxyl value)≧1 (acid value=15 to 80 mgKOH/g, hydroxyl value≧3.0 mgKOH/g)    Formula (1)

(A numeric value of the THF-insoluble fraction content expressed in % by weight)/(a numeric value of the softening point expressed in degree ° C.)≦0.2    Formula (2).

7 Claims, No Drawings

_US 8,592,120 B2_

RESIN FOR TONER AND TONER COMPOSITION

CROSS-REFERENCE TO RELATED APPLICATIONS

This application is the national stage application pursuant to 35 U.S.C. §371 of PCT application PCT/JP2008/059788, filed May 28, 2008, which claims priority to Japanese patent application No. 2007-146284, filed May 31, 2007. The contents of these applications are incorporated herein by reference in their entirety.

TECHNICAL FIELD

The present invention relates to resins for toners and toner compositions to be used in electrophotography, electrostatic recording, electrostatic printing, and so on.

BACKGROUND ART

Toners for developing electrostatic images to be used for thermal fixing systems are required to be not fused to a heat roll even at high fixing temperatures (hot offset property) and to be capable of being fixed even at low fixing temperatures (low-temperature fixing property). Generally, the hot offset property and the low-temperature fixing property of a toner is prone to be mutually contradictory properties. As a toner having well balanced hot offset property and low-temperature fixing property, a toner containing two polyesters different in glass transition temperature as resins for toner is disclosed (see, for example, patent document 1).

Patent document 1: JP 2005-221986 A

DISCLOSURE OF THE INVENTION

Problem to be Solved by the Invention

However, the toner proposed in the above-mentioned patent document is good to some extent in balance between the hot offset property and the low-temperature fixing property, but it is necessary to be improved in balancing the hot offset property and the low-temperature fixing property for speed-up and saving energy.

Means for Solving the Problem

The present inventors have studied assiduously to solve such problems and, as a result, have reached the present invention. That is, the present invention includes the following [1] and [2].

[1] A resin for toner, the resin comprising a polyester resin (A) having a THF-insoluble fraction content of from 1 to 36% by weight, a peak top molecular weight of 4500 to 20000 as determined by gel permeation chromatography on a THF-soluble fraction and a softening point of 120 to 180° C., and meeting the requirements represented by the following formulae (1) and (2):

$$\text{Acid value/hydroxyl value} \geq 1 \quad \text{Formula (1)}$$

wherein the acid value is 15 to 80 mgKOH/g, and the hydroxyl value is greater than 3.0 mgKOH/g;

$$\frac{\text{A numeric value of the THF-insoluble fraction content expressed in \% by weight}}{\text{a numeric value of the softening point expressed in degree ° C.}} \leq 0.2 \quad \text{Formula (2)}$$

[2] A toner composition containing this resin for toner, a colorant and, if necessary, one or more additives selected from mold release agents, charge control agents and fluidizing agents.

Effect of the Invention

By the use of the resin for toner of the present invention, a toner excellent in hot offset property and low-temperature fixing property can be attained and the anti-blocking property and the gloss generating property of the toner are also good.

BEST MODE FOR CARRYING OUT THE INVENTION

The present invention will be described in detail.

The polyester resin (A) in the resin for toner of the present invention is not particularly restricted, and examples thereof include products obtained by polycondensing at least one polyol component and at least one polycarboxylic acid component in one step or two or more steps.

As the polyester resin (A) is preferred a product obtained by reacting further a carboxylic acid to the terminal of a polyester resin, and more preferred is a product obtained by reacting a polyester resin (a) having a specific acid value and a specific hydroxyl value with at least one carboxylic acid (b) selected from the group consisting of aliphatic carboxylic acids, aromatic carboxylic acids, anhydrides of these carboxylic acids and lower alkyl (C1-C4) esters of these carboxylic acids, which product is described below.

As the aforementioned resin (a) is preferred a product obtained by polycondensing at least one polyol component with at least one polycarboxylic acid component.

Examples of dihydric alcohols (diols) among polyol components as raw materials of the polyester resin (a) include aliphatic diols having 2 to 36 carbon atoms (e.g., alkanediols such as ethylene glycol, 1,2-propylene glycol, 1,3-propylene glycol, 1,4-butanediol, 2,3-butanediol, 1,5-pentanediol, 2,3-pentanediol, 1,6-hexanediol, 2, 3-hexanediol, 3,4-hexanediol, neopentyl glycol, 1,7-heptanediol, and dodecanediol); polyalkylene ether glycols having 4 to 36 carbon atoms (diethylene glycol, dipropylene glycol, polyethylene glycol, polypropylene glycol, and the like); adducts of aliphatic diols having 2 to 36 carbon atoms with alkylene oxides (hereinafter abbreviated as AO) having 2 to 4 carbon atoms [ethylene oxide (hereinafter abbreviated as EO), propylene oxide (hereinafter abbreviated as PO), butylene oxide, and the like] (addition molar number: 2 to 30); alicyclic diols having 6 to 36 carbon atoms (1,4-cyclohexanedimethanol, hydrogenated bisphenol A, and the like); adducts of above-mentioned alicyclic diols with AOs having 2 to 4 carbon atoms (addition molar number: 2 to 30); adducts of bisphenols (bisphenol A, bisphenol F, bisphenol S, and the like) with AOs having 2 to 4 carbon atoms (addition molar number: 2 to 30). Two or more species may be used in combination.

Examples of tri- to octahydric or higher hydric polyols among polyol components include tri- to octahydric or higher hydric aliphatic polyols having 3 to 36 carbon atoms (glycerol, triethylolethane, trimethylolpropane, pentaerythritol, sorbitol, and the like); adducts of the hydric aliphatic polyols with AOs having 2 to 4 carbon atoms (addition molar number: 2 to 30); adducts of trisphenols (trisphenol PA, and the like) with AOs having 2 to 4 carbon atoms (addition molar number: 2 to 30); and adducts of novolak resins (phenol novolak, cresol novolak, and the like; average degree of polymerization: 3 to 60) with AOs having 2 to 4 carbon atoms (addition molar number: 2 to 30). Two or more species may be used in combination.

Preferred among such polyol components are polyalkylene ether glycols having 2 to 6 carbon atoms, alicyclic diols having 6 to 36 carbon atoms, adducts of alicyclic diols having 6 to 36 carbon atoms with AOs having 2 to 4 carbon atoms, adducts of bisphenols with AOs having 2 to 4 carbon atoms, and adducts of novolak resins with AOs having 2 to 4 carbon atoms. More preferred are adducts of bisphenols with AOs having 2 to 3 carbon atoms (EO and/or PO) and adducts of novolak resins with AOs having 2 to 3 carbon atoms (EO and/or PO).

Aliphatic dicarboxylic acids (including alicyclic ones) among polycarboxylic acid components which are raw materials of the polyester resin (a) may be alkane dicarboxylic acids having 2 to 50 carbon atoms (oxalic acid, malonic acid, succinic acid, adipic acid, lepargylic acid, sebacic acid, and the like); and alkene dicarboxylic acids having 4 to 50 carbon atoms (alkenyl succinic acids such as dodecenyl succinic acid, maleic acid, fumaric acid, citraconic acid, mesaconic acid, itaconic acid, glutaconic acid, and the like).

Aromatic dicarboxylic acids include, for example, aromatic dicarboxylic acids having 8 to 36 carbon atoms (phthalic acid, isophthalic acid, terephthalic acid, naphthalene-dicarboxylic acid, and the like).

Tri- or hexavalent or higher valent aliphatic polycarboxylic acids (including alicyclic ones) include, for example, aliphatic tricarboxylic acids having 6 to 36 carbon atoms (hexane tricarboxylic acid, and the like), and vinyl polymers of unsaturated carboxylic acids [number average molecular weight (hereinafter referred to as Mn, determined by gel permeation chromatography (GPC)): 450 to 10000] (α-olefin/maleic acid copolymers, and the like).

Among polycarboxylic acid components, tri- to hexavalent or higher valent aromatic polycarboxylic acids include, for example, aromatic polycarboxylic acids having 9 to 20 carbon atoms (trimellitic acid, pyromellitic acid, and the like); vinyl polymers of unsaturated carboxylic acids [Mn: 450 to 10000] (styrene/maleic acid copolymer, styrene/acrylic acid copolymer, styrene/fumaric acid copolymer, and the like).

As a polycarboxylic acid component, anhydrides and lower (C1-C4) alkyl esters (methyl ester, ethyl ester, isopropyl ester, and the like) of those polycarboxylic acids may also be used.

Preferred among such polycarboxylic acid components are alkane dicarboxylic acids having 2 to 50 carbon atoms, alkene dicarboxylic acids having 4 to 50 carbon atoms, aromatic dicarboxylic acids having 8 to 20 carbon atoms, and aromatic polycarboxylic acids having 9 to 20 carbon atoms. More preferred are adipic acid, alkenyl succinic acids having 16 to 50 carbon atoms, terephthalic acid, isophthalic acid, maleic acid, fumaric acid, trimellitic acid, pyromellitic acid, and their combinations. Particularly preferred are adipic acid, terephthalic acid, trimellitic acid, and their combinations. Anhydrides and lower alkyl esters of these acids are also preferred.

A preferred example of the polycarboxylic acid component is one comprising an aromatic polycarboxylic acid and, if necessary, an aliphatic polycarboxylic acid and containing the aromatic polycarboxylic acid in an amount of 60 mol % or more. The content of the aromatic polycarboxylic acid is more preferably 70 to 100 mol %, and particularly preferably 80 to 100 mol %. When an aromatic polycarboxylic acid is contained in an amount of 60 mol % or more, the resin strength increases and the low-temperature fixing property is further improved.

The polyester resin (a) can be produced in a similar manner as the production method of conventional polyester. For example, it can be produced by carrying out a reaction under an inert gas atmosphere (nitrogen gas and the like), preferably at a reaction temperature of 150 to 280° C., more preferably 160 to 250° C., and particularly preferably 170 to 240° C. From the viewpoint of certain execution of a polycondensation reaction, the reaction time is preferably not less than 30 minutes, and particularly preferably 2 to 40 hours.

At this time, an esterification catalyst may also be used according to demand. Examples of the esterification catalyst include tin-containing catalysts (e.g., dibutyltin oxide), antimony trioxide, titanium-containing catalysts [e.g., titanium alkoxides, potassium titanyl oxalate, titanium terephthalate, titanium terephthalate alkoxide, and dihydroxy bis(triethanolaminato)titanium and its intramolecular polycondensates], zirconium-containing catalysts (e.g., zirconium acetate), and zinc acetate. To improve the reaction rate of the last reaction stage, reducing the pressure is also effective.

The ratio of the polyol component to polycarboxylic acid component to be reacted, as expressed in terms of hydroxyl group-to-carboxyl group equivalent ratio [OH]/[COOH], is preferably 1.4/1 to 1/1, more preferably 1.35/1 to 1.1/1, and particularly preferably 1.35/1 to 1.2/1. When some component is removed out of the system during the reaction, the above-mentioned ratio is a ratio calculated by excluding the component.

The polyester resin (a) has an acid value of 6.0 (mgKOH/g, in which the following acid values are also expressed) or less and a hydroxyl value of 10 to 70 (mgKOH/g, in which the following hydroxyl values are also expressed). The acid value is preferably 5.0 or less, and more preferably 4.0 or less. The hydroxyl value is preferably 15 to 65, and more preferably 20 to 60. When the acid value is 6.0 or less or when the hydroxyl value is 70 or less, the polyester resin (a) has been polycondensed sufficiently and contains only a small amount of low molecular weight components, so that the storage stability of a resin for toner obtained by using it becomes good. If the hydroxyl value is 10 or more, the reaction efficiency with the carboxylic acid (b) is good.

In order to make the acid value and the hydroxyl value of a polyester resin (a) within those ranges, it is effective to adjust the ratio of the polyol component to the polycarboxylic acid component to be reacted.

The acid value and the hydroxyl value of a polyester resin referred to in the above and subsequent descriptions are determined by the methods provided in JIS K 0070 (1992).

In addition, in the case where a sample contains a solvent-insoluble fraction caused by crosslinking, a sample after melt kneaded in the following method is used.

Kneading apparatus: Labo plastomill MODEL 4M150 manufactured by Toyo Seiki Seisaku-sho, Ltd.

Kneading conditions: at 130° C., 70 rpm for 30 minutes.

Regarding the molecular weight of the polyester resin (a), the peak top molecular weight (hereinafter, Mp) is preferably 2000 to 10000. It is more preferable that the Mp be 3000 to 8000. The Mn is preferably 500 to 8000, and more preferably 1000 to 7000.

In the present invention, the molecular weights [Mp, Mn, and weight-average molecular weight (hereinafter, Mw)] of a polyester resin are determined using GPC under the following conditions:

Apparatus (example): HLC-8120, manufactured by Tosoh Corp.

Column (example): TSK GEL GMH6 (two columns), manufactured by Tosoh Corp.

Measurement temperature: 40° C.

Sample solution: 0.25% by weight THF (tetrahydrofuran) solution

Solution injection amount: 100 μl

Detection apparatus: Refractive index detector

Reference material: Standard polystyrenes manufactured by Tosoh Corp. (TSKstandard POLYSTYRENE) 12 points (molecular weight 1050, 2800, 5970, 9100, 18100, 37900, 96400, 190000, 355000, 1090000, 2890000 and 4480000)

The molecular weight corresponding to the maximum peak height on the chromatogram obtained is referred to as "peak top molecular weight (Mp)". In the measurement of a molecular weight, a solution resulting from dissolution of a polyester resin in THF and subsequent removal of insoluble contents with a glass filter was used as a sample solution.

The polyester resin (A) is preferably a resin obtained by causing a polyester resin (a) and at least one carboxylic acid (b) selected from the group consisting of aliphatic carboxylic acids, aromatic carboxylic acids, anhydrides of these carboxylic acids, and lower alkyl (C1-C4) esters of these carboxylic acids to react at a mixing ratio in the reaction expressed by an equivalent ratio OHa/COOHb of 0.1 to 1.0, wherein the equivalent of the hydroxyl groups originating in (a) is represented by OHa and the equivalent of the carboxyl groups originating in (b) is represented by COOHb. The OHa/COOHb is more preferably 0.2 to 0.9, and particularly preferably 0.3 to 0.8. When the OHa/COOHb is 0.1 or more, the molecular weight becomes sufficiently large and, as a result, the hot offset property of a toner is improved. When it is 1.0 or less, the fluidity of the resin becomes good and, as a result, the low-temperature fixing property and the gloss generating property of a toner are improved.

As the carboxylic acid (b), any one or both a monocarboxylic acid and a polycarboxylic acid may be used. Regarding the ratio of the monocarboxylic acid to the polycarboxylic acid, the equivalent ratio of the carboxyl groups originating in the monocarboxylic acid to the carboxyl groups originating in the polycarboxylic acid is preferably (0-50)/(50-100), and more preferably (0-20)/(80-100), wherein the equivalence of all the carboxyl groups in the carboxylic acids used in the reaction is let be 100. When the ratio of the carboxyl groups originating in the monocarboxylic acid is 50 or less, crosslinking does not occur insufficiently and the resin will become strong enough. Further, it is easy to adjust the acid value of a reaction product in a predetermined range easily.

As the carboxylic acid (b), acid anhydrides and lower alkyl (C1-C4) esters (methyl ester, ethyl ester, isopropyl ester, and the like) may also be used.

Among the monocarboxylic acids to be used as the carboxylic acid (b), examples of aliphatic (including alicyclic) monocarboxylic acids include alkane monocarboxylic acids having 1 to 50 carbon atoms (formic acid, acetic acid, propionic acid, butanoic acid, isobutanoic acid, caprylic acid, capric acid, lauric acid, myristylic acid, palmitic acid, stearic acid, and the like), and alkene monocarboxylic acids having 3 to 50 carbon atoms (acrylic acid, methacrylic acid, oleic acid, linoleic acid, and the like).

The aromatic monocarboxylic acids include, for example, aromatic monocarboxylic acids having 7 to 36 carbon atoms (benzoic acid, methylbenzoic acid, phenyl propionic acid, naphthoic acid, and the like).

Among the polycarboxylic acids to be used as the carboxylic acid (b), examples of aliphatic (including alicyclic) dicarboxylic acid, aromatic dicarboxylic acids, tri-to hexavalent or higher valent aliphatic (including alicyclic) polycarboxylic acids, and tri- to hexavalent or higher valent aromatic polycarboxylic acids maybe the same as those used in the polyester resin (a).

Preferred among these are divalent or higher valent aromatic carboxylic acids. More preferred are tri- to hexavalent or higher valent aromatic polycarboxylic acids. Particularly preferred are trimellitic acid and trimellitic anhydride.

The content of the tri- to hexavalent or higher valent aromatic polycarboxylic acid in the carboxylic acid component constituting the polyester (A) is preferably 1 to 30 mol %, and more preferably 2 to 20 mol %. When the content is 30 mol % or less, the fluidity of the resin is good and, as a result, the low-temperature fixing property of a toner is improved.

The polyester resin (A) can be obtained in the same method as the polyester resin (a) except for adjusting the product to have an acid value, a hydroxyl value, and an (acid value)/(hydroxyl value) ratio within the ranges given below.

The acid value of the polyester resin (A) in the present invention is 15 to 80, and preferably 18 to 60. The hydroxyl value is greater than 3.0, preferably greater than 8.0, more preferably 8.2 to 40, and particularly preferably 8.4 to 25.

If the acid value is less than 15 or if the hydroxyl value is 3.0 or less, the fixing strength decreases. If the acid value exceeds 80, the product becomes susceptible to environmental conditions and the stability is deteriorated.

In the present invention, the acid value and the hydroxyl value of the polyester resin (A) further satisfy the relationship of the following Formula (1):

$$(\text{Acid value})/(\text{hydroxyl value}) \geq 1 \qquad \text{Formula (1)}$$

wherein the acid value is 15 to 80 mgKOH/g, and the hydroxyl value is greater than 3.0 mgKOH/g.

If the (acid value)/(hydroxyl value) is less than 1, the glossiness at a gloss generating temperature or in a fixing temperature region decreases. The (acid value)/(hydroxyl value) ratio is preferably 2 to 10. In order to produce a polyester resin (A) which satisfies Formula (1), the purpose can be achieved by, for example, adjusting the ratio of the polyester resin (a) to the carboxylic acid (b) to be reacted.

The THF-insoluble fraction content of the polyester resin (A) is 1 to 36% by weight, preferably 2 to 33% by weight, more preferably 3 to 28% by weight, and particularly preferably 4 to 25% by weight. If the THF-insoluble fraction content is less than 1% by weight, the hot offset property deteriorates, and if it is greater than 36% by weight, the low-temperature fixing property deteriorates.

In the above and the following descriptions, a THF-insoluble fraction content of a polyester resin is determined by the following method.

50 ml of THF was added to 0.5 g of a sample, and subjected to agitation under refluxing for three hours. After cooling from the refluxing temperature to 20° C., an insoluble material was collected by filtration with a glass filter and the resin component remaining on the glass filter is dried under reduced pressure at 80° C. for 3 hours. An insoluble fraction content is calculated from the weight ratio of the dried resin component on the glass filter to the weight of the sample used.

From the viewpoints of hot offset property and low-temperature fixing property, the softening point of the polyester resin (A) to be used for the present invention is 120 to 180° C., preferably 122 to 170° C., and more preferably 123 to 155° C.

In the present invention, the temperature is increased at a uniform velocity under the following conditions by using a flow tester, and a temperature at which the amount of the resin outflow reached ½ is let be a softening point.

Apparatus: Flow Tester CFT-500 manufactured by Shimadzu Corp.

Load: 20 kg

Die: 1 mmΦ-1 mm

Rate of temperature rise: 6° C./min

In the present invention, the THF-insoluble fraction content and the softening point of the polyester resin (A) satisfy the relationship of the following Formula (2):

(A numeric value of the THF-insoluble fraction content expressed in % by weight)/(a numeric value of the softening point expressed in degree ° C.)≤0.2     Formula (2)

If the (THF-insoluble fraction content)/(softening point) is greater than 0.2, it is difficult to well balance the low-temperature fixing property and the hot offset property and the glossiness at a gloss generating temperature or in a fixing temperature region decreases. The (THF-insoluble fraction content)/(softening point) is preferably 0.01 to 0.19.

In order to produce a polyester resin (A) which satisfies Formula (2), the purpose can be achieved by, for example, producing a polyester resin (A) by a method in which a polyester resin (a) is produced and then the polyester resin (a) is caused to react with a carboxylic acid (b), and adjusting the hydroxyl value of the (a) to 10 to 70 mgKOH/g and adjusting the ratio of the polyester resin (a) and the carboxylic acid (b) to be reacted. Specifically, if the ratio of the polyester resin (a) and the carboxylic acid (b) to be reacted is made low [in other words, if the amount of the unreacted hydroxyl groups of the polyester resin (a) and the amount of the unreacted carboxyl groups of the carboxylic acid (b) are made large], the (THF-insoluble fraction content)/(softening point) decreases, whereas if the ratio of the polyester resin (a) and the carboxylic acid (b) to be reacted is made high [in other words, if the unreacted amount of hydroxyl groups of the polyester resin (a) and the unreacted amount of carboxyl groups of the carboxylic acid (b) are made small], the (THF-insoluble fraction content)/(softening point) increases.

With regard to the molecular weight of the polyester resin (A), Mp is 4500 to 20000, preferably 5000 to 20000, and more preferably 5500 to 15000. Mw is preferably 30000 to 300000, and more preferably 40000 to 250000. The ratio of Mw to Mn (hereinafter, Mw/Mn), which indicates molecular weight distribution, is preferably 15 to 100, and more preferably 20 to 90.

If the Mp, the Mw, and the Mw/Mn are within the aforementioned ranges, the balance between the hot offset property and the low-temperature fixing property is good.

In the present invention, the difference of the softening point of the polyester resin (A) between before and after heat-melting at 200° C. is preferably 10° C. or less, and more preferably 5° C. or less. The softening point after heat-melting at 200° C. is preferably 110 to 190° C., and more preferably 120 to 180° C.

The difference of the softening point between before and after heat-melting at 200° C. is measured as follows.

A test tube containing 3 g of the polyester resin (A) is placed in a block bath controlled at 200° C. and heat-melted for about 10 minutes. Then, the molten polyester resin (A) is charged along with the test tube into ice water to be cooled. As to the heat-melted polyester resin (A) and the polyester resin (A) before the heat-melting, the softening point is measured by the aforementioned method and then the difference between both the measurements is determined.

As to the polyester resin (A) in the present invention, the rate of change of the Mp of the fraction soluble in THF is preferably 10% or less when the Mp is measured before and after heat-melting at 200° C., and more preferably 9% or less. The Mp after heat-melting at 200° C. is preferably 4050 to 22000, and more preferably 4500 to 20000.

The method of the heat-melting treatment at 200° C. is the same as that described in the preceding section and the Mp is determined by a method the same as the aforementioned method for measuring the Mp of a polyester resin.

The method for minimizing the difference of the softening point between before and after heat-melting at 200° C. and the difference of the Mp of the THF-soluble fraction between before and after heat-melting at 200° C. may be, for example, a method in which the cooling of the polyester resin (A) performed after the completion of the reaction of the polyester resin (a) and the carboxylic acid (b) is carried out within a period of time as short as possible by using such an apparatus as a belt cooler.

The resin for toner of the present invention may contain, together with the polyester resin (A), a polyester resin (B) that contains no THF-insoluble fraction. The resin for toner of the present invention shows excellent fixing property even when it contains a polyester resin (A) without the polyester resin (B), but when it contains a polyester (B) together with the polyester resin (A), further improved fixability is obtained.

The polyester resin (B) is typically obtained by polycondensing at least one polyol component with at least one polycarboxylic acid component. The components are not particularly restricted.

Diols among the polyol components that serve as a raw material of the polyester resin (B) include, for example, aliphatic diols having 2 to 36 carbon atoms, polyalkylene ether glycols having 4 to 36 carbon atoms, adducts of aliphatic diols having 2 to 36 carbon atoms with AOs having 2 to 4 carbon atoms (addition molar number: 2 to 30); alicyclic diols having 6 to 36 carbon atoms, adducts of alicyclic diols having 6 to 36 carbon atoms with AOs having 2 to 4 carbon atoms (addition molar number: 2 to 30); and adducts of bisphenols with AOs having 2 to 4 carbon atoms (addition molar number: 2 to 30). Two or more species may be used in combination. Specific examples of these materials may be the same as those to be used for the above-mentioned polyester resin (a).

Tri- to octahydric or higher hydric alcohols among the polyol components include, for example, tri- to octahydric or higher hydric aliphatic polyols having 3 to 36 carbon atoms, adducts of aliphatic polyols with AOs having 2 to 4 carbon atoms (addition molar number: 2 to 30); adducts of trisphenols with AOs having 2 to 4 carbon atoms (addition molar number: 2 to 30); and adducts of novolak resins with AOs having 2 to 4 carbon atoms (addition molar number: 2 to 30). Two or more species may be used in combination. Specific examples of these materials may be the same as those to be used for the above-mentioned polyester resin (a).

Preferred among such polyol components are aliphatic diols having 2 to 6 carbon atoms, polyalkylene ether glycols having 4 to 36 carbon atoms, alicyclic diols having 6 to 36 carbon atoms, adducts of alicyclic diols having 6 to 36 carbon atoms with AOs having 2 to 4 carbon atoms, adducts of bisphenols with AOs having 2 to 4 carbon atoms, and adducts of novolak resins with AOs having 2 to 4 carbon atoms. More preferred are aliphatic diols having 2 to 6 carbon atoms, adducts of bisphenols with AOs having 2 to 3 carbon atoms (EO and PO) and adducts of novolak resins with AOs having 2 to 3 carbon atoms (EO and PO).

Among the polycarboxylic acid components, examples of aliphatic (including alicyclic) dicarboxylic acids, aromatic dicarboxylic acids, tri- to hexavalent or higher valent aliphatic (including alicyclic) polycarboxylic acids, and tri- to hexavalent or higher valent aromatic polycarboxylic acids may be the same as those used in the polyester resin (a).

As the polycarboxylic acid component, anhydrides and lower (C1-C4) alkyl esters of these polycarboxylic acids may be used.

Preferred among these polycarboxylic acids are the same as those of the polycarboxylic acid to be used in the polyester resin (a).

The acid value of the polyester resin (B) is preferably 5 to 80, more preferably 8 to 50, and particularly preferably 10 to 30.

The hydroxyl value is preferably 60 or less, more preferably 50 or less, and particularly preferably 5 to 45.

Regarding the molecular weight of the polyester resin (B), Mp is preferably 3000 to 10000, and more preferably 3500 to 9000.

The polyester resin (B) in the present invention can be produced in a similar manner to the production method of conventional polyester. For example, the same method as the production method of the above-mentioned polyester resin (a) can be used.

The polyol component to polycarboxylic acid component ratio to be reacted, as expressed in terms of hydroxyl group to carboxyl group equivalent ratio [OH]/[COOH], is preferably 2/1 to 1/2, more preferably 1.5/1 to 1/1.3, and particularly preferably 1.3/1 to 1/1.2.

The weight ratio of the polyester resin (A) to the polyester resin (B) in the resin for toner of the present invention is preferably (20 to 100)/(80 to 0), more preferably (30 to 99)/(70 to 1), and particularly preferably (40 to 90)/(60 to 10) wherein the sum total of the (A) and the (B) is let be 100. When the weight ratio of the polyester resin (A) is 20 or more, the strength of the resin increases and the fixing property in a high temperature region is good.

The resin for toner of the present invention preferably contains as the resin component only a polyester resin (A) or only a polyester resin (A) and polyester resin (B). It, however, may contain a resin other than these unless the characteristic properties of the resin for toner of the present invention are impaired. The other resin includes, for example, polyester resins other than (A) and (B), vinyl resins [e.g. styrene-alkyl (meth) acrylate copolymers, styrene-diene monomer copolymers], epoxy resins (e.g. ring opening polymerization products of bisphenol A diglycidyl ether), and urethane resins (e.g., polyaddition products of diol and/or trihydric or higher hydric polyol and diisocyanate). The Mn of the other resin is preferably 300 to 100000. The content of the other resin is preferably not more than 10% by weight, and more preferably not more than 8% by weight.

When two or more polyester resins are used in combination, or when at least one polyester resin is admixed with another resin, powder mixing or melt mixing may be carried out in advance or mixing may be carried out in toner preparation step.

The temperature in the melt mixing is preferably 80 to 180° C., more preferably 100 to 170° C., and particularly preferably 120 to 160° C.

If the mixing temperature is too low, mixing cannot be accomplished satisfactorily and the system may become inhomogeneous. When the mixing temperature in mixing two or more polyester resins together is excessively high, averaging due to transesterification or interesterification may occur, and it may thus become impossible to maintain those resin properties which are required of toner binders.

The mixing time for melt mixing is preferably 10 seconds to 30 minutes, more preferably 20 seconds to 10 minutes, and most preferably 30 seconds to 5 minutes. When the mixing time in mixing two or more polyester resins together is excessively long, averaging due to transesterification or interesterification may occur, and it may thus become impossible to maintain those resin properties which are required of toner binders.

The mixing apparatus for melt mixing includes, for example, batch type mixing apparatus such as reaction vessels, and continuous mixing apparatus. For attaining uniform mixing at an adequate temperature for a short period of time, a continuous mixing apparatus is preferred. As continuous mixing apparatuses, there are listed extruders, continuous kneaders, three-roll mills and so on. Among them, extruders and continuous kneaders are preferred.

In the case of powder mixing, mixing can be attained using conventional mixing conditions and a conventional mixing apparatus.

Regarding the mixing conditions in powder mixing, the mixing temperature is preferably 0 to 80° C., and more preferably 10 to 60° C. The mixing time is preferably not shorter than 3 minutes, and more preferably 5 to 60 minutes. The mixing apparatus includes, for example, Henschel mixers, Nauta mixers, and Banbury mixers. Henschel mixers are preferred.

The toner composition of the present invention comprises the resin for toner of the present invention, which serves as a binder resin, a colorant and, according to need, at least one additive selected from mold release agents, charge control agents, fluidizing agents, and so on.

As the colorant, any dye, pigment and the like which have been used as a colorant for toner can be used. Specific examples include carbon black, iron black, sudan black SM, fast yellow G, benzidine yellow, pigment yellow, indofast orange, Irgasine red, paranitroaniline red, toluidine red, carmine FB, pigment orange R, lake red 2G, rhodamine FB, rhodamine B lake, methyl violet B lake, phthalocyanine blue, pigment blue, brilliant green, phthalocyanine green, oil yellow GG, Kayaset YG, olasol brown B and oil pink OP. These may be used singly or in combination of two or more of them. According to need, a magnetic powder (a ferromagnetic metal powder such as iron, cobalt and nickel or a compound such as magnetite, hematite and ferrite) may be contained to serve also as a function as a colorant. The content of the colorant is preferably 1 to 40 parts, and more preferably 3 to 10 parts, based on 100 parts of the resin for toner of the present invention. In use of a magnetic powder, the amount thereof is preferably 20 to 150 parts, and more preferably 40 to 120 parts. In the above and following descriptions, "part" means "part by weight".

As the mold release agent, one having a softening point of 50 to 170° C. is preferred. Example thereof includes polyolefin wax, natural wax, aliphatic alcohols having 30 to 50 carbon atoms, fatty acids having 30 to 50 carbon atoms, and their mixtures. Examples of polyolefin wax include (co)polymers of olefins (e.g., ethylene, propylene, 1-butene, isobutylene, 1-hexene, 1-dodecene, 1-octadecene and their mixtures) [including products obtained by (co)polymerization and thermally degraded polyolefin], oxides of olefin (co)polymers prepared by use of oxygen and/or ozone, maleic acid-modified olefin (co)polymers [e.g., products modified with maleic acid or its derivative (maleic anhydride, monomethyl maleate, monobutyl maleate and dimethyl maleate)], copolymers of olefin and unsaturated carboxylic acid [(meth)acrylic acid, itaconic acid, maleic anhydride, and the like] and/or alkyl unsaturated carboxylates [alkyl (meth)acrylates (1 to 18 carbon atoms in the alkyl), alkyl maleates (1 to 18 carbon atoms in the alkyl), and the like], and Sasol wax.

The natural wax includes, for example, carnauba wax, montan wax, paraffin wax and rice wax. An example of the aliphatic alcohols having 30 to 50 carbon atoms is triacontanol. An example of the fatty acids having 30 to 50 carbon atoms is triacontan carboxylic acid.

Examples of the charge control agent include nigrosine dyes, triphenylmethane-based dyes containing a tertiary amine as a side chain, quaternary ammonium salts, polyamine resins, imidazole derivatives, quaternary ammonium salt-containing polymers, metal-containing azo dyes, copper phthalocyanine dyes, metal salts of salicylic acid, boron complexes of benzilic acid, sulfonic acid group-containing polymers, fluorine-containing polymers and halogen-substituted aromatic ring-containing polymers.

The fluidizing agent includes, for examples, colloidal silica, alumina powder, titanium oxide powder and calcium carbonate powder.

Regarding the weight ratio of the toner composition of the present invention, based on the weight of the toner, the resin for toner of the present invention is preferably 30 to 97% by weight, more preferably 40 to 95% by weight, and particularly preferably 45 to 92% by weight; the colorant is preferably 0.05 to 60% by weight, more preferably 0.1 to 55% by weight, and particularly preferably 0.5 to 50% by weight; among additives, the mold release agent is preferably 0 to 30% by weight, more preferably 0.5 to 20% by weight, and particularly preferably 1 to 10% by weight; the charge control agent is preferably 0 to 20% by weight, more preferably 0.1 to 10% by weight, and particularly preferably 0.5 to 7.5% by weight; and the fluidizing agent is preferably 0 to 10% by weight, more preferably 0 to 5% by weight, and particularly preferably 0.1 to 4% by weight. The total content of the additives is preferably 3 to 70% by weight, more preferably 4 to 58% by weight, and particularly preferably 5 to 50% by weight. When the compositional ratio of the toner falls within the above-mentioned range, a toner with good electrostatic property can be easily obtained.

The toner composition of the present invention may be prepared by any of conventionally known methods such as a kneading-pulverization method, an emulsion phase-inversion method and a polymerization method. For example, in obtaining a toner by kneading-pulverization method, it can be prepared by dry blending its components other than a fluidizing agent which are to constitute the toner, melt-kneading, then coarsely pulverizing, finally finely pulverizing using a jet mill pulverizer or the like, further classifying to form fine particles preferably having a volume average particle diameter (D50) of 5 to 20 μm, and then mixing a fluidizing agent. The particle diameter D50 is determined using a Coulter counter [e.g. commercial name: Multisizer III (manufactured by Coulter)].

In preparation of a toner by emulsion phase-inversion method, it can be prepared by dissolving or dispersing in an organic solvent the components other than a fluidizing agent which are to constitute the toner, emulsifying them, for example, by addition of water, and then conducting separation and classification. The volume average particle diameter of the toner is preferably 3 to 15 μm.

The toner composition of the present invention is mixed with carrier particles, such as iron powder, glass beads, nickel powder, ferrite, magnetite, and ferrite whose surfaces are coated with a resin (acrylic resin, silicone resin, and the like), depending upon needs, to be used as developer for developing electric latent images. The weight ratio of toner to carrier particles is usually 1/99 to 100/0. It is also possible to form electric latent images by friction with such a member as a charging blade in lieu of the use of carrier particles.

The toner composition of the present invention is then fixed to a support (e.g. paper and polyester film) by use of a copier, a printer or the like to form a recording material. As a fixing method to a support, conventional heat roll fixing method, flash fixing method, and the like can be used.

EXAMPLES

The following examples illustrate the present invention in further detail without restricting the scope of the present invention.

Example 1

A reaction vessel equipped with a condenser, a stirrer and a nitrogen inlet tube was charged with 41 parts (0.13 mol) of bisphenol A.EO (2 mol) adduct, 457 parts (1.14 mol) of bisphenol A.PO (3 mol) adduct, 9 parts (0.01 mol) of phenol novolak (the number of average functional groups: 5.6).PO (6 mol) adduct, 166 parts (1.0 mol) of terephthalic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. This is called polyester resin (a1).

Polyester resin (a1) had an acid value of 1.8, a hydroxyl value of 46, an Mn of 2500, and an Mp of 5500.

A reaction vessel equipped with a condenser, a stirrer and a nitrogen inlet tube was charged with 622 parts of polyester resin (al), 41 parts (0.21 mol) of trimellitic anhydride, and 3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and reduced pressure of 500 to 700 mmHg, and the product was taken out through a belt cooler when its softening point reached 135° C. The product was then pulverized to form particles. In the reaction, OHa/COOHb was 0.77. The product is called polyester resin (A1).

Polyester resin (A1) had an acid value of 20, a hydroxyl value of 10, an Mw of 120000, an Mp of 11000, a softening point of 135° C., and a THF-insoluble fraction content of 6% by weight, that is, the left side of Formula (1) was 2.0 and the left side of Formula (2) was 0.04. Moreover, when the polyester resin (A1) was heated and molten at 200° C. and then cooled in ice water, the softening point was 133° C. (the difference of the softening point before and after the heat-melting: −2° C.), and the Mp was 11500 (the rate of change of Mp before and after the heat-melting: +5%).

A reaction vessel equipped with a condenser, a stirrer and a nitrogen inlet tube was charged with 379 parts (1.2 mol) of bisphenol A.EO (2 mol) adduct, 447 parts (1.3 mol) of bisphenol A.PO (2 mol) adduct, 332 parts (2.0 mol) of terephthalic acid and 3 parts of tetrabutoxy titanate as a condensation catalyst, and a reaction was carried out under a nitrogen stream at 230° C. for 5 hours while water produced was distilled off. Subsequently, a further reaction was carried out under a vacuum of 5 to 20 mmHg, followed by cooling to 180° C. when the acid value became 2 or less. Then, 40 parts (0.21 mol) of trimellitic anhydride was added and a reaction was carried out under ordinary pressure for 2 hours in a hermetic condition. The product was taken out, cooled to room temperature and then pulverized to form particles. The product is called polyester resin (B1).

Polyester resin (B1) had an acid value of 21, a hydroxyl value of 37, an Mn of 2000, an Mp of 4200, and a THF-insoluble fraction content of 0% by weight.

Seven hundred (700) parts of polyester resin (A1) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (1) for toner of the present invention was obtained.

Example 2

A reaction vessel equipped with a condenser, a stirrer and a nitrogen inlet tube was charged with 37 parts (0.11 mol) of bisphenol A.EO (2 mol) adduct, 407 parts (1.01 mol) of bisphenol A.PO (3 mol) adduct, 22 parts (0.03 mol) of phenol novolak (the number of average functional groups: 5.6).PO (6 mol) adduct, 166 parts (1.0 mol) of terephthalic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. This is called polyester resin (a2).

Polyester resin (a2) had an acid value of 2.1, a hydroxyl value of 38, an Mn of 3000, and an Mp of 5800.

A reaction vessel equipped with a condenser, a stirrer and a nitrogen inlet tube was charged with 596 parts of polyester resin (a2), 31 parts (0.1 mol) of trimellitic anhydride, and 3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and reduced pressure of 500 to 700 mmHg, and the product was taken out through a belt cooler when its softening point reached 130° C. The product was then pulverized to form particles. In the reaction, OHa/COOHb was 0.51. The product is called polyester resin (A2).

Polyester resin (A2) had an acid value of 30, a hydroxyl value of 12, an Mw of 70000, an Mp of 7600, a softening point of 130° C., and a THF-insoluble fraction content of 20% by weight, that is, the left side of Formula (1) was 2.5 and the left side of Formula (2) was 0.15. Moreover, when the polyester resin (A2) was heated and molten at 200° C. and then cooled in ice water, the softening point was 132° C. (the difference of the softening point before and after the heat-melting: +2° C.), and the Mp was 7300 (the rate of change of Mp before and after the heat-melting: −4%).

Seven hundred (700) parts of polyester resin (A2) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (2) for toner of the present invention was obtained.

Example 3

A reaction vessel equipped with a condenser, a stirrer and a nitrogen inlet tube was charged with 3 parts (0.01 mol) of bisphenol A.EO (2 mol) adduct, 486 parts (1.21 mol) of bisphenol A.PO (3 mol) adduct, 23 parts (0.03 mol) of phenol novolak (the number of average functional groups: 5.6).PO (6 mol) adduct, 159 parts (0.96 mol) of terephthalic acid, 6 parts (0.04 mol) of adipic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. This is called polyester resin (a3).

Polyester resin (a3) had an acid value of 1.6, a hydroxyl value of 53, an Mn of 2000, and an Mp of 4800.

A reaction vessel equipped with a condenser, a stirrer and a nitrogen inlet tube was charged with 650 parts of polyester resin (a3), 56 parts (0.29 mol) of trimellitic anhydride, and 3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and reduced pressure of 500 to 700 mmHg, and the product was taken out through a belt cooler when its softening point reached 135° C. The product was then pulverized to form particles. In the reaction, OHa/COOHb was 0.31. The product is called polyester resin (A3).

Polyester resin (A3) had an acid value of 40, a hydroxyl value of 8.4, an Mw of 60000, an Mp of 6800, a softening point of 135° C., and a THF-insoluble fraction content of 25% by weight, that is, the left side of Formula (1) was 4.8 and the left side of Formula (2) was 0.19. Moreover, when the polyester resin (A3) was heated and molten at 200° C. and then cooled in ice water, the softening point was 140° C. (the difference of the softening point before and after the heat-melting: +5° C.), and the Mp was 7300 (the rate of change of Mp before and after the heat-melting: +7%).

Seven hundred (700) parts of polyester resin (A3) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (3) for toner of the present invention was obtained.

Example 4

A reaction vessel equipped with a condenser, a stirrer and a nitrogen inlet tube was charged with 228 parts (3.0 mol) of 1,2-propylene glycol (hereinafter, referred to as propylene glycol), 141 parts (0.85 mol) of terephthalic acid, 22 parts (0.15 mol) of adipic acid and 3 parts of tetrabutoxy titanate as a condensation catalyst, and then a reaction was carried out under a nitrogen stream at 180° C. for 8 hours while methanol produced was distilled off. Subsequently, during a slow increase of the temperature to 230° C., the reaction was carried out under a nitrogen stream for 4 hours while propylene glycol and water produced were distilled off. Thereafter, a further reaction was carried out under a vacuum of 5 to 20 mmHg and the product was taken out when its softening point reached 100° C. The resin taken out was cooled to room temperature and then pulverized to form particles. This is called polyester resin (a4). Polyester resin (a4) had an acid value of 0.8, a hydroxyl value of 21, an Mn of 5500, and an Mp of 9000.

A reaction vessel equipped with a condenser, a stirrer and a nitrogen inlet tube was charged with 206 parts of polyester resin (a4), 8 parts (0.04 mol) of trimellitic anhydride, and 0.3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and reduced pressure of 5 to 20 mmHg, and the product was taken out through a belt cooler when its softening point reached 154° C. The product was then pulverized to form particles. In the reaction, OHa/COOHb was 0.43. The product is called polyester resin (A4).

Polyester resin (A4) had an acid value of 16, a hydroxyl value of 3.3, an Mw of 195000, an Mp of 14000, a softening point of 154° C., and a THF-insoluble fraction content of 5% by weight, that is, the left side of Formula (1) was 4.9 and the left side of Formula (2) was 0.03. Moreover, when the polyester resin (A4) was heated and molten at 200° C. and then cooled in ice water, the softening point was 152° C. (the difference of the softening point before and after the heat-melting: −2° C.), and the Mp was 13600 (the rate of change of Mp before and after the heat-melting: −3%).

Seven hundred (700) parts of polyester resin (A4) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (4) for toner of the present invention was obtained.

Example 5

A reaction vessel equipped with a condenser, a stirrer and a nitrogen inlet tube was charged with 3 parts (0.01 mol) of bisphenol A.EO (2 mol) adduct, 98 parts (0.28 mol) of bisphenol A.PO (2 mol) adduct, 339 parts (0.84 mol) of bisphenol A.PO (3 mol) adduct, 22 parts (0.03 mol) of phenol novolak (the number of average functional groups: 5.6).PO (6 mol) adduct, 141 parts (0.85 mol) of terephthalic acid, 9 parts (0.08 mol) of fumaric acid, 9 parts (0.05 mol) of trimellitic anhydride, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. This is called polyester resin (a5).

Polyester resin (a5) had an acid value of 1.3, a hydroxyl value of 39, an Mn of 1600, and an Mp of 3300.

A reaction vessel equipped with a condenser, a stirrer and a nitrogen inlet tube was charged with 583 parts of polyester resin (a5), 28 parts (0.15 mol) of trimellitic anhydride, and 1 part of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 200° C. and reduced pressure (10 to 50 mmHg) and ordinary pressure (760 mmHg), and the product was taken out through a belt cooler when its softening point reached 142° C. The product was then pulverized to form particles. In the reaction, OHa/COOHb was 0.94. The product is called polyester resin (A5).

Polyester resin (A5) had an acid value of 24, a hydroxyl value of 23, an Mw of 53000, an Mp of 5000, a softening point of 142° C., and a THF-insoluble fraction content of 28% by weight, that is, the left side of Formula (1) was 1.0 and the left side of Formula (2) was 0.20. Moreover, when the polyester resin (A5) was heated and molten at 200° C. and then cooled in ice water, the softening point was 150° C. (the difference of the softening point before and after the heat-melting: +8° C.), and the Mp was 4800 (the rate of change of Mp before and after the heat-melting: −4%).

Four hundred and fifty (450) parts of polyester resin (A5) and 550 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (5) for toner of the present invention was obtained.

Example 6

A reaction vessel equipped with a condenser, a stirrer and a nitrogen inlet tube was charged with 3 parts (0.01 mol) of bisphenol A.EO (2 mol) adduct, 572 parts (01.42 mol) of bisphenol A.PO (3 mol) adduct, 22 parts (0.03 mol) of phenol novolak (the number of average functional groups: 5.6).PO (6 mol) adduct, 166 parts (1.00 mol) of terephthalic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 10 or less, the product was taken out, cooled to room temperature, and ground to particles. This is called polyester resin (a6).

Polyester resin (a6) had an acid value of 7.6, a hydroxyl value of 84, an Mn of 900, and an Mp of 2100.

A reaction vessel equipped with a condenser, a stirrer and a nitrogen inlet tube was charged with 724 parts of polyester resin (a6), 132 parts (0.69 mol) of trimellitic anhydride, and 1 part of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 200° C. and reduced pressure (50 to 100 mmHg), and the product was taken out through a belt cooler when its softening point reached 123° C. The product was then pulverized to form particles. In the reaction, OHa/COOHb was 0.36. The product is called polyester resin (A6).

Polyester resin (A6) had an acid value of 55, a hydroxyl value of 4.1, an Mw of 111000, an Mp of 5500, a softening point of 123° C., and a THF-insoluble fraction content of 9% by weight, that is, the left side of Formula (1) was 13.4 and the left side of Formula (2) was 0.07. Moreover, when the polyester resin (A6) was heated and molten at 200° C. and then cooled in ice water, the softening point was 120° C. (the difference of the softening point before and after the heat-melting: −3° C.), and the Mp was 5800 (the rate of change of Mp before and after the heat-melting: +5%).

Eight hundred (800) parts of polyester resin (A6) and 200 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (6) for toner of the present invention was obtained.

Example 7

The aforementioned polyester resin (A1) was used as resin (7) for toner of the present invention.

Example 8

Six hundred (600) parts of polyester resin (A2) and 400 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (8) for toner of the present invention was obtained.

Comparative Example 1

A reaction vessel equipped with a condenser, a stirrer and a nitrogen inlet tube was charged with 572 parts (1.4 mol) of bisphenol A.PO (3 mol) adduct, 22 parts (0.03 mol) of phenol novolak (the number of average functional groups: 5.6).PO (6 mol) adduct, 166 parts (1.0 mol) of terephthalic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. The product is called polyester resin (c1).

Polyester resin (c1) had an acid value of 1.9, a hydroxyl value of 76, an Mn of 1000, and an Mp of 2500.

A reaction vessel equipped with a condenser, a stirrer and a nitrogen inlet tube was charged with 724 parts of polyester resin (c1), 83 parts (0.43 mol) of trimellitic anhydride, and 3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and a vacuum of 10 to 50 mmHg, and the product was taken out when its softening point reached 125° C. The product was cooled to room temperature and then pulverized to form particles. In the reaction, OHa/COOHb was 0.79. The product is called polyester resin (C1).

Polyester resin (C1) had an acid value of 25, a hydroxyl value of 23, an Mw of 15000, an Mp of 5000, a softening point of 135° C., and a THF-insoluble fraction content of 35% by weight, that is, the left side of Formula (1) was 1.1 and the left side of Formula (2) was 0.26.

Moreover, when the polyester resin (C1) was heated and molten at 200° C. and then cooled in ice water, the softening point was 123° C. (the difference of the softening point before and after the heat-melting: −12° C.), and the Mp was 4000 (the rate of change of Mp before and after the heat-melting: −20%).

Seven hundred (700) parts of polyester resin (C1) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (9) for toner for comparison use was obtained.

Comparative Example 2

A reaction vessel equipped with a condenser, a stirrer and a nitrogen inlet tube was charged with 572 parts (1.4 mol) of bisphenol A.PO (3 mol) adduct, 22 parts (0.03 mol) of phenol novolak (the number of average functional groups: 5.6).PO (6 mol) adduct, 166 parts (1.0 mol) of terephthalic acid, and 3 parts of tetrabutoxy titanate as a condensation catalyst, and a reaction was carried out under a nitrogen stream at 230° C. for 5 hours while water produced was distilled off. Then, the reaction was further caused to proceed under reduced pressure (5 to 20 mm Hg) and when the acid value reached 2 or less, the product was taken out, cooled to room temperature, and ground to particles. The product is called polyester resin (c2).

Polyester resin (c2) had an acid value of 1.8, a hydroxyl value of 46, an Mn of 2500, and an Mp of 5500.

A reaction vessel equipped with a condenser, a stirrer and a nitrogen inlet tube was charged with 716 parts of polyester resin (c1), 50 parts (0.26 mol) of trimellitic anhydride, and 3 parts of tetrabutoxy titanate as a condensation catalyst. After replacing of the vapor phase in the system by nitrogen, a reaction was carried out at 180° C. under ordinary pressure for 2 hours in a hermetic condition. Thereafter, a further reaction was carried out at 220° C. and a vacuum of 500 to 700 mmHg, and the product was taken out when its softening point reached 130° C. The product was cooled to room temperature and then pulverized to form particles. In the reaction, OHa/COOHb was 3.37. The product is called polyester resin (C2).

Polyester resin (C2) had an acid value of 18, a hydroxyl value of 36, an Mw of 25000, an Mp of 5500, a softening point of 140° C., and a THF-insoluble fraction content of 18% by weight, that is, the left side of Formula (1) was 0.5 and the left side of Formula (2) was 0.13.

Moreover, when the polyester resin (C2) was heated and molten at 200° C. and then cooled in ice water, the softening point was 130° C. (the difference of the softening point before and after the heat-melting: −10° C.), and the Mp was 4000 (the rate of change of Mp before and after the heat-melting: −27%).

Seven hundred (700) parts of polyester resin (C2) and 300 parts of polyester resin (B1) were melt-kneaded in a continuous kneader at a jacket temperature of 150° C. and a residence time of 3 minutes. The melted resin was cooled to room temperature and then pulverized by a pulverizer to provide particles. Thus, resin (10) for toner for comparison use was obtained.

Examples [9-16], Comparative Examples [3, 4]

To each of resins (1) to (8) for toner of the present invention and resins (9) and (10) for toner for comparison use in an amount of 100 parts, 8 parts of carbon black MA-100 (manufactured by Mitsubishi Chemical Co., Inc.), 5 parts of carnauba wax and 1 part of charge control agent T-77 (manufactured by Hodogaya Chemical Co., Ltd.) were added, followed by toner compounding in the following procedures.

Premixing was carried out using a Henschel mixer (FM10B, manufactured by Mitsui Miike Kakoki) and then kneading was carried out using a twin-screw kneader (PCM-30, manufactured by Ikegai Corporation). The mixture was then finely pulverized using a supersonic jet pulverizer [Labojet, manufactured by Nippon Pneumatic Mfg. Co.], followed by classification using an air classifier [model MDS-I, manufactured by Nippon Pneumatic] to give toner particles with a particle diameter D50 of 8 µm. Subsequently, 0.5 parts of colloidal silica (Aerosil R972: manufactured by Nippon Aerosil Co., Ltd.) was mixed with 100 parts of toner particles using a sample mill to provide toner compositions (T1) to (T8) of the present invention and comparative toner compositions (T9) and (T10).

The results of evaluations made by the following evaluation methods are shown in Table 1.

TABLE 1

|  | Toner No. | MET (° C.) | HOT (° C.) | Anti-blocking property | Gloss generating temperature (° C.) |
|---|---|---|---|---|---|
| Example 9 | (T1) | 125 | 230 | ⊚ | 126 |
| Example 10 | (T2) | 130 | 230 | ⊚ | 130 |

TABLE 1-continued

| | Toner No. | MET (° C.) | HOT (° C.) | Anti-blocking property | Gloss generating temperature (° C.) |
|---|---|---|---|---|---|
| Example 11 | (T3) | 125 | 230 | ◉ | 124 |
| Example 12 | (T4) | 130 | 220 | ○ | 129 |
| Example 13 | (T5) | 135 | 220 | ◉ | 133 |
| Example 14 | (T6) | 130 | 220 | ○ | 130 |
| Example 15 | (T7) | 135 | 230 | ◉ | 131 |
| Example 16 | (T8) | 125 | 220 | ○ | 126 |
| Comparative Example 3 | (T9) | 135 | 220 | ○ | 138 |
| Comparative Example 4 | (T10) | 135 | 210 | ○ | 133 |

[Method of Evaluation]

[1] Minimum Fixing Temperature (MFT)

A fixing device of a commercially available copier (AR5030: manufactured by Sharp Corporation) was used to evaluate a pre-fixing image developed by the copier. A fixing roll temperature, at which an image density remaining percentage after rubbing a fixed image by a pad became at least 70%, was made a minimum fixing temperature.

[2] Hot Offset Occurrence Temperature (HOT)

Like the above MFT, evaluation of fixing was made, and the existence of hot offset on a fixed image was evaluated visually. A fixing roll temperature, at which hot offset was occurred, was made an hot offset occurrence temperature.

[3] Test of Toner's Anti-Blocking Property

Each of the toner compositions was conditioned in a high-temperature and high-humidity environment (50° C., 85% R.H.) for 48 hours. Under the same environment the blocking of each developer was visually judged, and the image quality of a copy produced by use of a commercially available copier (AR5030; manufactured by Sharp Corp.) was also observed.

Criterion

◉: No blocking of the toner is recognized and image quality after 3000-sheet copying is good.

○: No blocking of the toner is recognized, but slight disorder in image quality after 3000-sheet copying is recognized.

Δ: Blocking of the toner is visually recognized and disorder in image quality after 3000-sheet copying is recognized.

x: Blocking of the toner is visually recognized and images are no longer formed before 3000-sheet copying.

[4] Gloss Generating Temperature (GLOSS)

A two-component developer for the evaluation was prepared by uniformly mixing 30 parts of each toner and 800 parts of a ferrite carrier (F-150; manufactured by Powdertech Co.). Pre-fixed images developed on a commercial copier (AR 5030; manufactured by Sharp Corp.) using the developer were fixed at a process speed of 120 mm/sec on a fixing machine prepared by modifying the fixing unit of a commercial printer (LBP 2160; manufactured by Canon Inc.) so that the heat roller temperature might be varied. The fixing roll temperature at which the fixed image showed a 60° gloss of not less than 10% was determined using a commercial gloss-meter (MURAKAMI COLOR RESEARCH LABORATORY model gmx-202-60) and recorded as the gloss generating temperature.

INDUSTRIAL APPLICABILITY

The toner composition and the resin for toner of the present invention are useful as a toner for developing electrostatic charge images and a resin for such toner which are excellent in low-temperature fixing property, hot offset property, and developability.

The invention claimed is:

1. A resin for toner, the resin comprising a polyester resin (A) having a THF-insoluble fraction content of from 1 to 36% by weight, a peak top molecular weight of 4500 to 20000 as determined by gel permeation chromatography on a THF-soluble fraction and a softening point of 120 to 180° C., and meeting the requirements represented by the following mathematical formulae (1) and (2):

$$\text{Acid value/hydroxyl value} \geq 2 \quad \text{Formula (1)}$$

wherein the acid value is 15 to 80 mgKOH/g, and the hydroxyl value is 8.2 to 40 mgKOH/g;

$$[\text{A numeric value of the THF-insoluble fraction content expressed in \% by weight}]/[\text{a numeric value of the softening point expressed in degree ° C.}] \leq 0.2 \quad \text{Formula (2);}$$

wherein the polyester resin (A) is reaction product of a polyester resin (a) having an acid value of 6.0 mgKOH/g or less and a hydroxyl value of from 10 to 70 mgKOH/g and at least one carboxylic acid (b) selected from the group consisting of divalent or higher valent aromatic carboxylic acids, acid anhydrides of these carboxylic acids, and alkyl C1-C4 alkyl esters of these carboxylic acids, wherein the polyester resin (a) is a polycondensate of at least one polyol component selected from the group consisting of polyalkylene ether glycols having 2 to 6 carbon atoms, alicyclic diols having 6 to 36 carbon atoms, adducts of alicyclic diols having 6 to 36 carbon atoms with alkylene oxides having 2 to 4 carbon atoms, adducts of bisphenols with alkylene oxides having 2 to 4 carbon atoms, and adducts of novolak resins with alkylene oxides having 2 to 4 carbon atoms and at least one polycarboxylic acid component selected from the group consisting of adipic acid, alkenyl succinic acids having 16 to 50 carbon atoms, terephthalic acid, isophthalic acid, maleic acid, fumaric acid, trimellitic acid, pyromellitic acid, acid anhydrides of these carboxylic acids and C1-C4 alkyl esters of these carboxylic acids.

2. The resin for toner according to claim 1, wherein the polyester resin (A) has a weight average molecular weight of from 30000 to 300000.

3. The resin for toner according to claim 1, wherein the difference of the softening point of the polyester resin (A) between before and after heat-melting at 200° C. is 10° C. or less.

4. The resin for toner according to claim 1, wherein the percentage of the difference between the peak top molecular weight of the THF-soluble fraction measured by gel permeation chromatography before and after heat-melting the polyester resin (A) at 200° C. is 10% or less of the measurement done before heat-melting the polyester resin (A) at 200° C.

5. The resin for toner according to claim 1, wherein the resin for toner is further comprises , in addition to the polyester resin (A), a polyester resin (B) having no THF-insoluble fraction.

6. The resin for toner according to claim 5, wherein the weight ratio of the polyester resin (A) and the polyester resin (B) represented as the polyester resin (A)/ the polyester resin (B) is (20-100)/(80-0) wherein the sum total of the polyester resin (A) and the polyester resin (B) is 100.

7. A toner composition comprising the resin for toner according to claim 1, a colorant and, if necessary, one or more additives selected from mold release agents, charge control agents and fluidizing agents.

* * * * *